United States Patent
Engert

[15] 3,684,212
[45] Aug. 15, 1972

[54] MAGNETIC TAPE RECORDER

[72] Inventor: Heinz-Dieter Engert, Munich, Germany

[73] Assignee: Sud-Atlas-Werke G.m.b.H., Munich, Germany

[22] Filed: Nov. 27, 1970

[21] Appl. No.: 93,163

[30] Foreign Application Priority Data

May 26, 1970 Germany..........P 20 25 524.7

[52] U.S. Cl.....................................242/201, 192/44
[51] Int. Cl...........................B11b 15/32, G03b 1/04
[58] Field of Search..............242/197, 204, 206, 210; 192/44, 45, 38

[56] References Cited

UNITED STATES PATENTS 3,085,758 4/1963 Herrmann et al..........242/201

*Primary Examiner*—Leonard D. Christian
*Attorney*—McGlew and Toren

[57] ABSTRACT

A magnetic tape recorder, particularly of the cassette type, has a tape driving sound shaft, a pair of carrier spindles for the tape reels, a tension-friction drive and a friction clutch interconnecting the spindles for conjoint rotation responsive to tape driving during sound recording and reproduction, and selectively engageable intermediate friction drive members for driving the spindles from the sound shaft during rapid forward and reverse runs of the tape. The friction clutch comprises a first clutch member secured on a carrier spindle and a second clutch member freely rotatable about the spindle and designed as a cord pulley for the tension-friction drive. The clutch members have hubs concentrically embracing one another in radially spaced relation to define an annular space therebetween, and balls are arranged in the annular space and support the clutch members on each other free from play for relative rotation and axial displacement. Preferably, the balls are retained in a cage and in two axially spaced rows, with the balls in each row alternating with each other.

10 Claims, 3 Drawing Figures

INVENTOR
Heinz-Dieter Engert
By
McGlew and Toren

MAGNETIC TAPE RECORDER

BACKGROUND OF THE INVENTION

In a magnetic tape recorder of the mentioned type, the reel carrier spindles are preferably interconnected by elastic tension means such as, for example, a rubber cord, etc. During sound recording and reproducing, this tension means transmits to the receiving reel the torque exerted, by the tension of the tape on the supply reel, in order to effect winding of the tape fed by the sound shaft. The diameter variations of the tape rolls resulting from rotation of the tape reels are compensated by a friction clutch arranged between the reel carrier spindles and which, in addition, is disengaged in the positions "stop", "rapid tape feed" and "rewind".

It has been found that the shifting mobility of these friction clutches is slow, under the influence of the tension means acting directly on the clutch members, and this has an adverse effect particularly when shifting to the rapid tape runs. If the clutch members are not separated in time, disturbing loads on the mechanical drive, and inadmissible tensile stresses on the tape, are produced when the intermediate drives for the rapid tape runs are engaged. This has an adverse effect on the synchronous conditions in such tape recorders.

SUMMARY OF THE INVENTION

This invention relates to magnetic tape recorders, particularly of the cassette type, and more particularly to an improved friction clutch included in a tension-friction drive interconnecting the carrier spindles for the tape reels.

The objective of the invention is to provide measures, in magnetic recorders of this type, which help improve the shifting mobility of the clutch members of friction clutches included between the reel carrier spindles. For this purpose, a friction clutch embodying the invention comprises a clutch member secured on a carrier spindle and another clutch member which serves as a cord pulley. These clutch members embrace each other concentrically and in radially spaced relation, and are supported one on the other, free from play, for relative rotation and relative axial displacement by balls arranged in the annular space between the clutch members. Preferably, the clutch members are arranged on that carrier spindle serving, during recording and reproduction, as the tape supply reel spindle. The fixed clutch member, secured on the carrier spindle, has an axially elongated hub, and the freely rotating clutch member has a hub extending concentrically of the axially extending hub, to form bearing surfaces for the balls.

The mutual support of the two clutch members by the balls has the result that the clutch members can be rotated and displaced relative to each other particularly easily, so that the freely rotating clutch member can disengage itself rapidly and safely from the clutch member secured on the carrier spindle, to disengage the friction clutch. This assures separation of the clutch members, particularly during shifting to the rapid tape runs, and prevents accidental rotation of the other carrier spindle. The rolling friction of the balls on the bearing surfaces of the clutch members also has the effect that the transverse forces exerted by the elastic tension means interconnecting the carrier spindles on the rotating clutch member remain ineffective to a great extent.

In a preferred embodiment of the invention, the balls are arranged in a guide cage or the like, to maintain certain predetermined positions of the balls in the annular space between the clutch members, and the balls are held by this cage in predetermined planes in the annular space. Preferably, the balls are held in the guide cage in two axially spaced planes. It has been found advantageous to provide three balls in each plane, and the balls in the two planes are spaced by the same angular distance. The balls of the two planes are arranged in the guide cage either in series or in staggered relation to each other. Preferably the balls are retained with play by the guide cage, for example, by means of bends or lugs, so that a simply assembly of the friction clutch is assured by providing a common unit consisting of the balls and the guide cage.

The axial movements of the freely moving clutch member, necessary for shifting the friction clutch, can be effected at random, preferably by means of a displaceable and pivotal supporting body which is associated with the freely rotating clutch member as an abutment and which brings or holds the latter in the clutch engaged position against the action of a restoring force, for example, gravity, spring force, etc. For such a supporting body there can be used, for example, a leaf spring which engages an operating slide acting as a control means for the tape pressing roller and as a carrier of the recording and reproducing head. In order to attain a tight frictional engagement between the two clutch members, with low pressures, a friction ring, etc., of a material having a high coefficient of friction is interposed between the facing friction surfaces of the two clutch members.

An object of the invention is to provide an improved friction clutch for magnetic tape recorders.

Another object of the invention is to provide a friction clutch with greatly increased mobility of the clutch members.

A further object of the invention is to provide such a friction clutch in which two clutch members can be rotated and axially displaced relative to each other particularly easily.

Another object of the invention is to provide such a friction clutch which, particularly during shifting to rapid tape runs, prevents accidental rotation of a carrier spindle.

Another object of the invention is to provide such a friction clutch in which the clutch members concentrically embrace each other and define an annular space therebetween receiving balls acting as bearings between the two clutch members.

For an understanding of the principles of the invention, reference is made to the following description of a typical embodiment thereof as illustrated in the accompanying drawing.

DESCRIPTION OF THE PREFERRED EMBODIMENT

Figure 1:
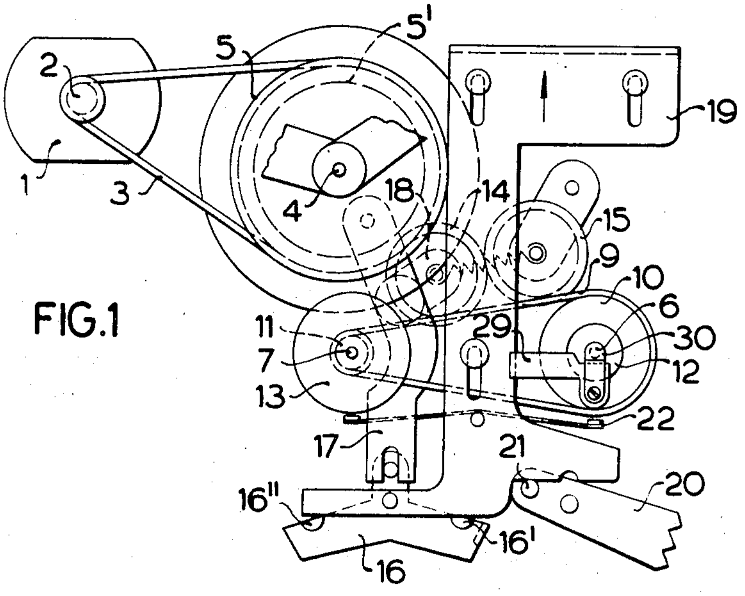
FIG. 1 is a somewhat schematic bottom plan view of a tape recorder embodying the invention.

Referring to FIG. 1, a driving motor 1 has an output pulley 2 connected by an elastic driving cord 3 to a cord pulley 5 fixedly connected with a tape driving sound shaft 4. Pulley 5 has relatively large dimensions in order that it may further serve as a flywheel mass. In addition, a cylindrical circumferential part 5′ of pulley 5 permits the latter to act as a friction wheel. Sound shaft 4 feeds the tape in connection with a pressure roller (not shown) in a known manner during sound recording and reproduction.

Figures 2, 3:
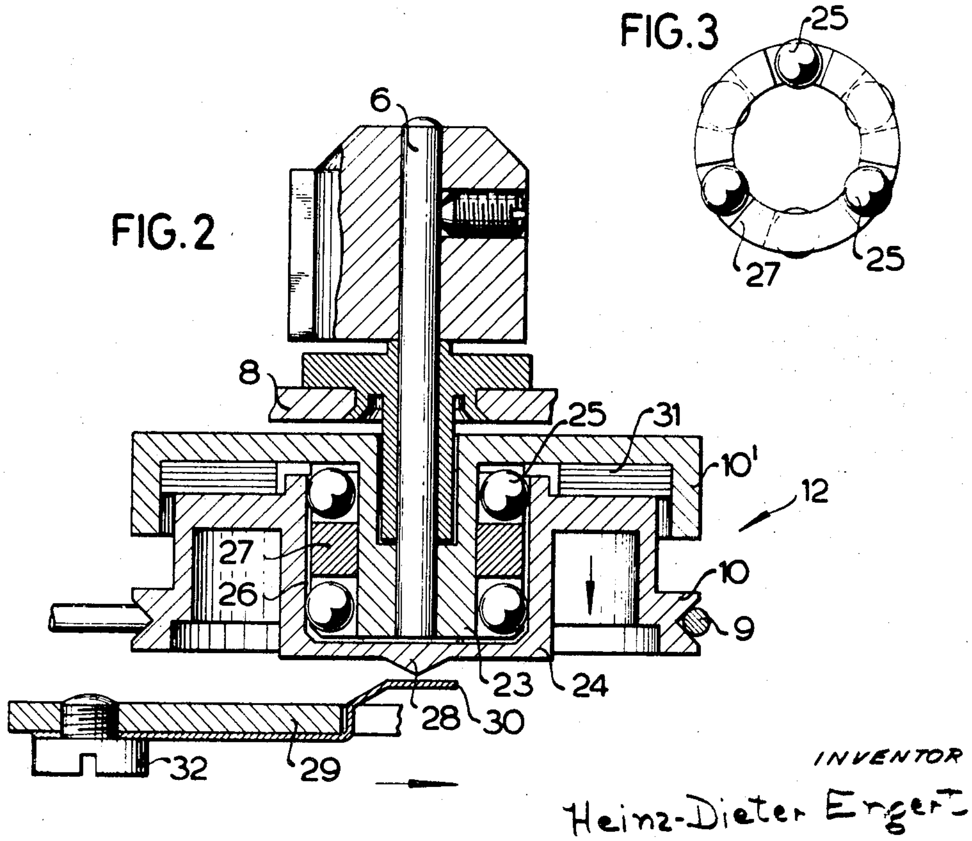
FIG. 2 is an axial sectional view, on an enlarged scale, of a friction clutch embodying the invention.
FIG. 3 is a top plan view of a ball guide cage embodying the invention.

The tape is unwound from a supply reel and fed to a receiving wheel on which it is wound up as a roll. The supply reel is carried by a reel carrier spindle 6, and the receiving reel by a reel carrier spindle 7, both of which are rotatably mounted in the recorder housing 8 (FIG. 2). Reel carrier spindles 6 and 7 are interconnected, in the illustrated embodiment, by a driving cord 9, for example, of rubber, etc., which is trained, for this purpose, around respective cord pulleys 10 and 11 connected with reel carrier spindles 6 and 7.

Under the influence of the tape tension, the feeding movements of the tape on sound shaft 4 rotate reel carrier spindle 6 which, in turn, rotates reel carrier spindle 7 of the receiving reel, through cord pulley 10, driving cord 9 and cord pulley 11. In order to compensate the varying diameters of the tape rolls on the supply reel and on the receiving reel, a friction clutch 12 is arranged in the drive between the reel carrier spindles 6 and 7 and, as illustrated in FIG. 2, can be formed by a cord pulley 10 and a friction wheel 10′. Clutch 12 thus permits compensating greater winding velocities on the receiving reel by sliding of its clutch members 10 and 10′ on each other.

As can be seen in FIG. 1, reel carrier spindle 7 has fixed thereon a friction wheel 13, so that a rapid advance of the tape can be effected by engaging an intermediate friction wheel 14 with friction wheel 13 and with the cylindrical circumferential part 5′ of cord pulley 9, with simultaneous disengagement of friction clutch 12 and release of the tape engaging sound shaft 4 and after lifting the magnetic heads from the tape. A rapid rewind of the tape can be effected by the cooperation of intermediate friction wheel 14 with the cylindrical circumferential part 5′ of cord pulley 5 and another intermediate friction wheel 15, engageable with friction wheel 10′.

The necessary control movements are effected by turning a shift-rocker 16 which effects movements of intermediate wheels 14 and 15 through the medium of a shift lever 17 and a carrier lever 18. Rocker 16 act, in either of its operated positions, through lugs 16′ and 16″ on an operating slide 19 for the pressure roller of the tape (not shown), and which slide also serves as a magnetic head carrier. A pivotal adjusting member 20 can also displace operating slide 19 through an adjusting pin 21, in order to select the positions "recording", "reproducing"‴"stop". Pin 21 actuates switches in the circuit of the amplifier for recording and reproduction. Spring brakes 22, secured on slide 19, permit locking reel carrier spindles 6 and 7 against rotation in the "stop" position.

As best seen in FIG. 2, reel carrier spindle 6 fixedly mounts friction wheel 10′ forming a clutch member of friction clutch 12. Wheel 10′ is provided with a cylindrical hub 23 which is embraced, in radially spaced relation, by a hub 24 of cord pulley 10 acting as a freely rotating clutch member. By inserting balls 25 in the annular space 26 between hubs 23 and 24, wheel 10′ and pulley 10 are supported on one another for relative rotation and relative axial displacement in the manner of a ball bearing. Balls 25 are arranged in a guide cage 27, in the form of three balls in each of two superposed axial planes, with the balls in each plane being at the same angular spacing from each other. Preferably, the balls 25 in the two planes are staggered by 60° in cage 27. Cage 27 can be designed so the balls 25 are fixed by lugs, etc., freely rotating in the cage in order thus to provide a unit including the balls and the guide cage, which facilitates assembly.

Cord pulley 10, acting as a moving clutch member, is provided with a central supporting lug 28, as can be seen in FIG. 2. In the disengaged position of clutch 12, lug 28 bears rotatably on a bend 29 of operating slide 19. In the engaged position of the clutch 12, lug 28 bears on an offset 30 to apply cord pulley 10, by axial displacement, against a friction ring 31 for coupling friction wheel 10′ and cord pulley 10. By bend 29 or offset 30 moving alternately beneath supporting lug 28, cord pulley 10, acting as a freely movable clutch member, is brought into the disengaged or engaged positions. The displacement movements of pulley 10 are made particularly easy by the insertions of the balls 25 in annular space 26. For the offset 30, there is used, in the illustrated embodiment, a spring band section, etc., which is secured movably on bend 29 by means of a clamping screw 32 so that an overtension is provided to compensate axial tolerances or distance variations. Friction ring 31 is made of a material having a high coefficient of friction, so that even low clutch pressures assure a tight frictional engagement between wheel 10′ and pulley 10.

It will be understood that the invention is by no means limited to the illustrated number of balls 25 or to a certain size of these balls. Furthermore, other or additional clutch members can be used instead of friction wheel 10′ and cord pulley 10. The controlling determinant is rather that the clutch members are supported on each other by means of balls to ensure the easy run necessary in such tape recorders and to eliminate the transverse forces exerted by driving cord 9 on the clutch members.

While a specific embodiment of the invention has been shown and described in detail to illustrate the application of the principles of the invention, it will be understood that the invention may be embodied otherwise without departing from such principles.

What is claimed is:

1. In a magnetic tape recorder, particularly of the cassette type, having a tape driving sound shaft, a pair of carrier spindles for reels on which the tape is wound and unwound, a tension-friction drive and a friction clutch interconnecting the spindles for conjoint rotation responsive to tape driving by the sound shaft during sound recording and reproduction, and selectively engageable intermediate drives for driving the spindles from the sound shaft during rapid forward and reverse runs of the tape: an improved friction clutch comprising, in combination, a first clutch member secured on a carrier spindle; a second clutch member freely rotatable about the carrier spindle and designed as a cord pulley for the tension-friction drive; said clutch members concentrically embracing one another in radially spaced relation to define an annular space therebetween; and balls arranged in said annular space and supporting said members on each other free from play for relative rotation and axial displacement.

2. In a magnetic tape recorder, an improved friction clutch, as claimed in claim 1, in which said first clutch member is designed as a friction wheel cooperable with said intermediate drives for effecting rapid runs of the tape.

3. In a magnetic tape recorder, an improved friction clutch, as claimed in claim 1, including a guide cage retaining said balls in preselected diametric planes in said annular space.

4. In a magnetic tape recorder, an improved friction clutch, as claimed in claim 1, in which said clutch members have facing friction surfaces; and a friction ring, of a material having a high coefficient of friction, interposed between said facing friction surfaces for engagement thereby upon engagement of said clutch.

5. In a magnetic tape recorder, particularly of the cassette type, having a tape driving sound shaft, a pair of carrier spindles for reels on which the tape is wound and unwound, a tension-friction drive and a friction clutch interconnecting the spindles for conjoint rotation responsive to tape driving by the sound shaft during sound recording and reproduction, and selectively engageable intermediate drives for driving the spindles from the sound shaft during rapid forward and reverse runs of the tape: an improved friction clutch comprising, in combination, a first clutch member secured on a carrier spindle; a second clutch member freely rotatable about the carrier spindle and designed as a cord pulley for the tension-friction drive; said clutch members concentrically embracing one another in radially spaced relation to define an annular space therebetween; and balls arranged in said annular space and supporting said members on each other free from play for relative rotation and axial displacement; said clutch members being arranged on the carrier spindle for that reel serving as the supply reel during sound recording and reproduction.

6. In a magnetic tape recorder, particularly of the cassette type, having a tape driving sound shaft, a pair of carrier spindles for reels on which the tape is wound and unwound, a tension-friction drive and a friction clutch interconnecting the spindles for conjoint rotation responsive to tape driving by the sound shaft during sound recording and reproduction, and selectively engageable intermediate drives for driving the spindles from the sound shaft during rapid forward and reverse runs of the tape: an improved friction clutch comprising, in combination, a first clutch member secured on a carrier spindle; a second clutch member freely rotatable about the carrier spindle and designed as a cord pulley for the tension-friction drive; said clutch members concentrically embracing one another in radially spaced relation to define an annular space therebetween; and balls arranged in said annular space and supporting said members on each other free from play for relative rotation and axial displacement; said first clutch member having a coaxial hub having a bearing surface for said balls; said second clutch member having a hollow cylindrical hub with an additional bearing surface for said balls, extending in spaced concentric relation with the hub of said first clutch member.

7. In a magnetic tape recorder, particularly of the cassette type, having a tape driving sound shaft, a pair of carrier spindles for reels on which the tape is wound and unwound, a tension-friction drive and a friction clutch interconnecting the spindles for conjoint rotation responsive to tape driving by the sound shaft during sound recording and reproduction, and selectively engageable intermediate drives for driving the spindles from the sound shaft during rapid forward and reverse runs of the tape: an improved friction clutch comprising, in combination, a first clutch member secured on a carrier spindle; a second clutch member freely rotatable about the carrier spindle and designed as a cord pulley for the tension-friction drive; said clutch members concentrically embracing one another in radially spaced relation to define an annular space therebetween; balls arranged in said annular space and supporting said members on each other free from play for relative rotation and axial displacement; and a guide cage retaining said balls in preselected diametric planes in said annular space; said balls being arranged in two diametric planes spaced axially from each other.

8. In a magnetic tape recorder, particularly of the cassette type, having a tape driving sound shaft, a pair of carrier spindles for reels on which the tape is wound and unwound, a tension-friction drive and a friction clutch interconnecting the spindles for conjoint rotation responsive to tape driving by the sound shaft during sound recording and reproduction, and selectively engageable intermediate drives for driving the spindles from the sound shaft during rapid forward and reverse runs of the tape: an improved friction clutch comprising, in combination, a first clutch member secured on a carrier spindle; a second clutch member freely rotatable about the carrier spindle and designed as a cord pulley for the tension-friction drive; said clutch members concentrically embracing one another in radially spaced relation to define an annular space therebetween; balls arranged in said annular space and supporting said members on each other free from play for relative rotation and axial displacement; and a guide cage retaining said balls in preselected diametric planes in said annular space; there being three balls in each plane.

9. In a magnetic tape recorder, particularly of the cassette type, having a tape driving sound shaft, a pair of carrier spindles for reels on which the tape is wound and unwound, a tension-friction drive and a friction clutch interconnecting the spindles for conjoint rotation responsive to tape driving by the sound shaft during sound recording and reproduction, and and selectively engageable intermediate drives for driving the spindles from the sound shaft during rapid forward and reverse runs of the tape: an improved friction clutch comprising, in combination, a first clutch member secured on a carrier spindle; a second clutch member freely rotatable about the carrier spindle and designed as a cord pulley for the tension-friction drive; said clutch members concentrically embracing one another in radially spaced relation to define an annular space therebetween; balls arranged in said annular space and supporting said members on each other free from play for relative rotation and axial displacement; and a guide cage retaining said balls in preselected diametric planes in said annular space; the balls in each plane in the guide cage being staggered by the same angular distance in both the vertical and horizontal direction.

10. In a magnetic tape recorder, particularly of the cassette type, having a tape driving sound shaft, a pair of carrier spindles for reels on which the tape is wound and unwound, a tension-friction drive and a friction clutch interconnecting the spindles for conjoint rotation responsive to tape driving by the sound shaft during sound recording and reproduction, and selectively engageable intermediate drives for driving the spindles from the sound shaft during rapid forward and reverse runs of the tape: an improved friction clutch comprising, in combination, a first clutch member secured on a carrier spindle; a second clutch member freely rotatable about the carrier spindle and designed as a cord pulley for the tension-friction drive; said clutch members concentrically embracing one another in radially spaced relation to define an annular space therebetween; balls arranged in said annular space and supporting said members on each other free from play for relative rotation and axial displacement; and a rotatable and displaceable supporting body engageable with said second clutch member to move the same into the clutch-engaged position against the action of a restoring force.

* * * * *